Patented Jan. 23, 1934

1,944,300

UNITED STATES PATENT OFFICE 1,944,300

ALIPHATIC AMINE SULPHONIC ACID CONTAINING EIGHT OR MORE CARBON ATOMS

Karl Ott, Leverkusen-on-the-Rhine, Winfrid Hentrich, Erlangen, and Helmut Keppler, Cologne-on-the-Rhine, Germany, assignors to I. G. Farbenindustrie Aktiengesellschaft, Frankfort-on-the-Main, Germany No Drawing. Application April 13, 1931, Serial No. 529,888, and in Germany May 12, 1930

3 Claims. (Cl. 260—127)

The present invention relates to new aminosulphonic acids which are substituted in the amino group by a saturated or unsaturated higher aliphatic radical containing at least 8 carbon atoms. The new compounds correspond to the probable general formula:

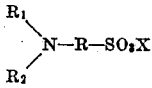

wherein R stands for a substituted or unsubstituted alkylene or aralkylene radical, such as ethylene, propylene, $CH_2 - CHOH - CH_2$, $C_6H_4-CH_2$, $C_6H_3Cl-CH_2$, $C_6H_3NO_2$, X stands for hydrogen, ammonium ($NH_4$) or a metallic equivalent, $R_1$ represents a saturated or unsaturated aliphatic radical containing at least 8 carbon atoms, $R_2$ stands for hydrogen, alkyl, aralkyl, aryl or cycloaryl or a saturated or unsaturated aliphatic radical containing at least 8 carbon atoms, or for the group $RSO_3X$ wherein R stands for the same group as stated above.

The manufacture of these compounds is carried out by causing an alkyl-, aralkyl- or aryl sulphonic acid or a salt thereof containing a labile halogen atom in the alkyl or aralkyl or aryl group to react in known manner with a higher aliphatic amine of the general formula:

wherein $R_1$ and $R_2$ are interpreted as stated above in which the saturated or unsaturated aliphatic radical contains at least 8 carbon atoms or by causing an alkyl, aralkyl or aryl halide to react in the usual manner with a higher aliphatic amine of the kind referred to above and subjecting the resulting reaction products to a treatment with a sulphonating agent. These processes can be effected with homogeneous higher aliphatic amines or mixtures thereof.

The new compounds are colorless or weakly colored substances soluble in water and are suitable as auxiliary products in the textile industry as softening, purifying, frothing, wetting, washing and dispersing agents and in facilitating even dyeing. The efficacy of the same is to a large extent independent of the reaction and of any salt content in the washing and refining baths.

Our invention is illustrated by the following examples without being limited thereto. The parts are by weight.

Example 1:—32 parts of the sodium salt of β- chloro-ethane-sulphonic acid are introduced with stirring into 102 parts of the heptadecylamine at about 55° C. The temperature is raised to about 100 to 200° C. and maintained until a test portion gives a uniform emulsion with aqueous alkali. Instead of using an excess of heptadecylamine other suitable acid binding agents may be employed, such as a dialkyl aniline or caustic soda or other like substances. After the addition of the necessary quantity of fixed alkali or alkaline earth hydroxides easily volatile bases consumed for fixing the liberated hydrochloric acid can be distilled off.

The reaction product gives with water weakly alkaline reacting turbid, frothy solutions from which the reaction product is precipitated on heating with the addition of a mineral acid. The product thus isolated can be purified by extracting with organic solvents, such as ether or petroleum ether after transforming it into a salt with the aid of a surplus of an alkali metal or an alkaline earth metal hydroxide or carbonate. A colorless mass is thus produced which readily gives a clear solution in water. The aqueous solutions are not sensitive to acids or to calcium salts.

The raw products as above mentioned can also be made inert to acids, by reacting upon the raw product with dimethyl-sulphonate in an aqueous alkaline solution, while stirring at room temperature or a little higher temperature, until a test of the solution does not give any precipitation when acidified with hydrochloric acid to a Congo acid reaction. A colorless soap-like mass is obtained after neutralization and vaporization.

Compounds of similar properties are obtained by the use of pentadecylamine or undecylamine or dodecylamine. These amines are obtainable from stearic acid or palmitic acid or lauric acid by means of the Curtius' reaction (see Hollemann, Lehrbuch der organischen Chemie 1930, page 292).

The products thus obtained are wax-like viscous, more or less strongly basic, colorless substances insoluble in water or only soluble in a colloidal state but easily soluble in organic solvents, such as ether, petroleum ether, benzene, benzine and alcohol. The pentadecylamine melts at 34° C., (compare Journal für praktische Chemie, volume 64, page 436), the heptadecylamine melts at 49° C., (see, for example, Berichte der deutschen chemischen Gesellschaft, volume 21, page 2489). The undecylamine is liquid at room temperature and boils at a temperature of about 234 to 237° C. The dodecylamine is produced by causing the mineral acid esters of dodecyl alcohol to react upon ammonia.

*Example 2:*—25 parts of the sodium salt of benzylchloride-p-sulphonic acid are dissolved in 100 parts of water. A solution of 25 parts of heptadecylamine in 150 parts of acetone is slowly dropped in at about 40 to 60° C. with constant stirring; 55 parts of 10% aqueous caustic soda solution are then gradually added and finally the temperature is raised to 75° C. After evaporation a weakly colored, soap-like mass is obtained, the turbid alkaline aqueous solutions of which froth strongly.

The raw product is heated in vacuo to about 150 to 250° C. for the further purification. By this process a small quantity of a colorless substance insoluble in water distils over. The residue gives a clear solution with water possessing a good stability to acids and calcium salts.

*Example 3:*—500 parts of heptadecylamine are slowly added to 145 parts of benzyl chloride at an initial temperature of 90° C. The temperature is allowed to rise to about 130 to 140° C. and the reaction is then completed in a short time. The reaction product mainly consists of the hydrochloride of the mono-benzylated compound which can be crystallized from alcohol.

If 500 parts of heptadecylamine are heated with 520 parts of benzyl chloride and 350 parts of pyridine for one hour at 120 to 140° C., the reaction product is obtained on pouring into water rendered alkaline as a solid, white compound which crystallizes from alcohol in lustrous crystals of fat-like appearance which melt at 180 to 190° C.

For the purpose of sulphonation the hydrochloride of benzylheptadecylamine is dissolved in carbon tetrachloride and treated with 400 parts of chlorosulphonic acid at ordinary temperature. The temperature is slowly raised to about 40 to 50° C., the mass is stirred for some time, and finally the reaction product is poured on ice. After the removal of the carbon tetrachloride the sulphonic acid is obtained as a wax-like mass, which dissolves readily in alkali. After the addition of a surplus of alkali the substance can be further worked up as mentioned in Examples 1 and 2.

In an analogous manner dibenzylheptadecylamine can be sulphonated and eventually purified.

We claim:

1. The compounds of the probable general formula:

wherein R stands for an alkylene or aralkylene radical which may be substituted by oxygen, a hydroxy group or a halogen atom, X stands for hydrogen, ammonium ($NH_4$) or a metallic equivalent, $R_1$ stands for an aliphatic radical which may be substituted by oxygen, a hydroxy group or a halogen atom and which contains at least 8 carbon atoms, $R_2$ stands for hydrogen, or a substituent of the group consisting of an alkyl, aralkyl or aryl or cycloaryl radical, an aliphatic radical containing at least 8 carbon atoms and $RSO_3X$, R and X being defined as above, said compounds being colorless or weakly colored substances soluble in water and suitable as auxiliary products in the textile industry.

2. The compounds of the probable formula:

wherein R stands for an alkylene or aralkylene radical which may be substituted by oxygen, a hydroxy group or a halogen atom, X stands for hydrogen, ammonium or a metallic equivalent and alkyl stands for an alkyl radical containing at least 8 carbon atoms, being colorless or weakly colored substances soluble in water and suitable as auxiliary products in the textile industry.

3. The sodium salt of N-heptadecyl-ethyl-amino-beta-sulfonic acid having the probable formula:

being a colorless powder easily soluble in water and particularly suitable as a softening, purifying, frothing, wetting, washing and dispersing agent.

KARL OTT.
WINFRID HENTRICH.
HELMUT KEPPLER.